United States Patent
Kagle et al.

(10) Patent No.: US 6,967,680 B1
(45) Date of Patent: Nov. 22, 2005

(54) METHOD AND APPARATUS FOR CAPTURING IMAGES

(75) Inventors: Jonathan C. Kagle, Redmond, WA (US); Gilad Odinak, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/505,223

(22) Filed: Feb. 16, 2000

Related U.S. Application Data

(60) Provisional application No. 60/136,517, filed on May 28, 1999.

(51) Int. Cl.$^7$ .................. H04N 5/228; H04N 9/73; H04N 5/235
(52) U.S. Cl. .................. 348/222.1; 348/223.1; 348/229.1; 348/362
(58) Field of Search .................. 348/221.1, 222.1, 348/223.1, 224.1, 225.1, 226.1, 227.1, 228.1, 348/229.1, 345, 349, 362, 364, 365, 366, 348/353

(56) References Cited

U.S. PATENT DOCUMENTS

| | | | | |
|---|---|---|---|---|
| 5,189,519 A | * | 2/1993 | Miyamoto et al. | 348/365 |
| 5,260,774 A | * | 11/1993 | Takayama | 348/655 |
| 5,563,658 A | * | 10/1996 | Parulski et al. | 348/350 |
| 5,751,354 A | * | 5/1998 | Suzuki et al. | 348/349 |
| 5,929,908 A | * | 7/1999 | Takahashi et al. | 348/364 |
| 6,489,989 B1 | * | 12/2002 | Shapiro et al. | 348/180 |
| 6,614,480 B1 | * | 9/2003 | Oda et al. | 348/351 |
| 6,727,943 B1 | * | 4/2004 | Juen | 348/223.1 |

* cited by examiner

*Primary Examiner*—David L. Ometz
*Assistant Examiner*—Brian Genco
(74) *Attorney, Agent, or Firm*—Theodore M. Magee; Westman, Champlin & Kelly, P.A.

(57) ABSTRACT

A method and a camera perform processing functions based on a preliminary frame of light before capturing a second frame of light that forms a final camera image. After the light for the final image is captured, additional post-capture processing is performed on image data produced from that light. The results of the pre-capture processing are combined with the results of the post-capture processing to produce a final set of image data.

13 Claims, 6 Drawing Sheets

US 6,967,680 B1

METHOD AND APPARATUS FOR CAPTURING IMAGES

REFERENCE TO RELATED APPLICATIONS

The present application claims priority from a U.S. Provisional Application having Ser. No. 60/136,517, filed on May 28, 1999 and entitled "EARLY IMAGE ACQUISITION".

BACKGROUND OF THE INVENTION

The present application relates to digital cameras. In particular, the present invention relates to image control and processing in digital cameras.

Digital cameras capture images by converting light into electrical signals and processing the electrical signals to produce a set of image data. The image data is then stored in a long-term memory for later retrieval.

The processing of captured images is compute-intensive, often making the user wait for the final picture after the shutter button is pressed. For users who want to take a series of photographs in rapid succession, this delay is undesirable.

SUMMARY OF THE INVENTION

The present invention provides a method and a camera that perform processing functions based on a preliminary frame of light before capturing a second frame of light that forms the final image. After the light for the final image is captured, additional post-capture processing is performed on image data produced from that light. The results of the pre-capture processing are combined with the results of the post-capture processing to produce a final set of image data.

In some embodiments, the pre-capture processing includes image processing such as white balance, contrast, and/or red-eye reduction. In other embodiments, the pre-capture processing identifies and modifies performance characteristics of the camera such as available memory, flash parameters and defective pixels in the photo array.

Under some embodiments, at least one of the pre-capture processing functions is repeated using a portion of the data from the second frame of light. The results based on the second frame of light are compared to the pre-capture results and if the results are too different, the pre-processing function is repeated for the entire second frame of light.

Under some embodiments, the pre-capture processing is performed repeatedly until the user depresses a capture button. In other embodiments, the pre-capture processing is performed when the user depresses the capture button half-way, and the post-capture processing is performed when the user depresses the capture button fully. In still other embodiments, the pre-capture processing is performed during a red-eye reduction flash before a main flash is triggered to capture the final image.

DETAILED DESCRIPTION OF ILLUSTRATIVE EMBODIMENTS

Figure 1:
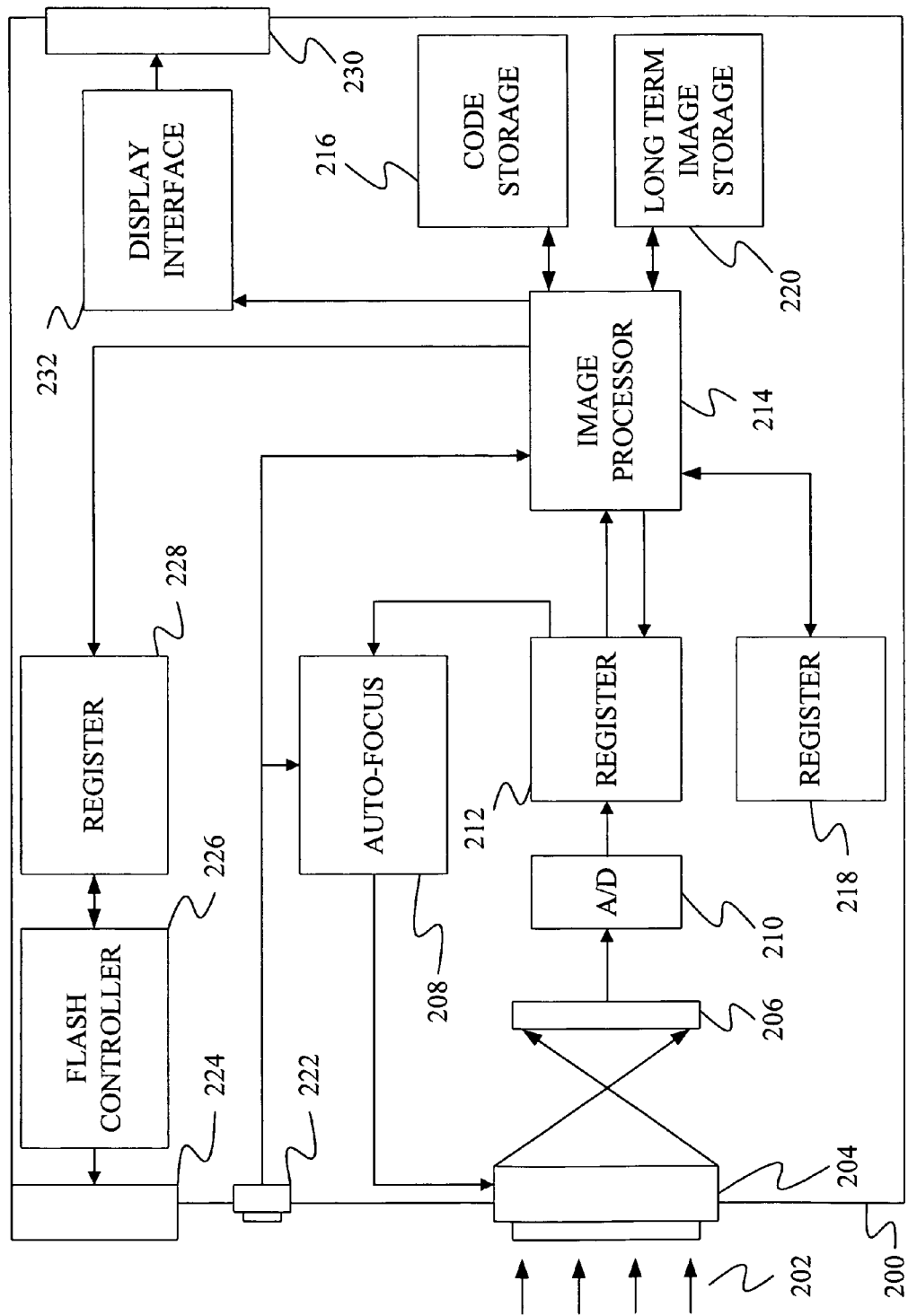
FIG. 1 is a general block diagram of a camera under an embodiment of the present invention.

FIG. 1 is a block diagram of a camera 200 under an embodiment of the present invention. Light 202 enters camera 200 through a lens assembly 204, which focuses the light onto a photo array 206. In many embodiments, lens assembly 204 is controlled by an auto-focus controller 208 that modifies lens assembly 204 to bring an image into focus on photo array 206.

Photo array 206 is constructed of an array of specialized transistors known as Charge Coupled Devices (CCDs). For black-and-white images, each CCD represents a separate pixel in the captured image. For color images, a set of CCD pixels with overlaid color filters are combined to represent a single pixel, with each CCD providing information on a different color of light.

Based on the output of the CCDs, photo array 206 transmits an analog signal to an analog-to-digital (A/D) converter 210. A/D converter 210 converts the analog signal into a series of digital values, with each value representing the brightness or intensity of a pixel's color. The digital values produced by A/D converter 210 are stored in a register 212 that receives read and write control signals from an image processor 214. By controlling when A/D converter 210 can write to register 212, image processor 214 is able to capture and store values representing a single frame of light.

Image processor 214 and auto-focus controller 208 are able to access and use the image data in register 212. Auto-focus controller 208 uses the data to adjust lens assembly 204. Image processor 214 uses the image data for a number of processing functions described further below.

In most embodiments, image processor 214 processes the image data in register 212 using software components stored in code storage 216. Intermediate results of this processing are stored in a second register 218, and the final image data resulting from the processing is stored in long-term storage 220.

In most embodiments, image processor 214 receives input from a capture button 222 that is depressed by the user to indicate when the user wants to capture an image. In some embodiments, the user is able to press capture button 222 half-way down to indicate that they want the camera to prepare to capture an image by, for example, activating the auto-focus feature of the camera.

Image processor 214 is also able to set parameters for a flash 224, which is controlled by a flash controller 226. The flash parameters are stored in register 228 by image processor 214 and include parameters such as a red-eye reduction flash parameter, a duration parameter, and a brightness parameter.

Under the present invention, image processor 214 performs some processing functions before the user indicates that they wish to capture an image. Thus, before capture button 222 is fully depressed, image processor 214 performs one or more functions such as white balance, contrast adjustment, and red-eye reduction. After the user fully depress capture button 222, image processor 214 performs additional post-capture processing functions. The results of the pre-capture and post-capture processing functions are then combined to produce a final set of image data. By performing some of the image processing functions before the user tries to capture an image, the present invention reduces the post-capture processing time.

Figure 2:
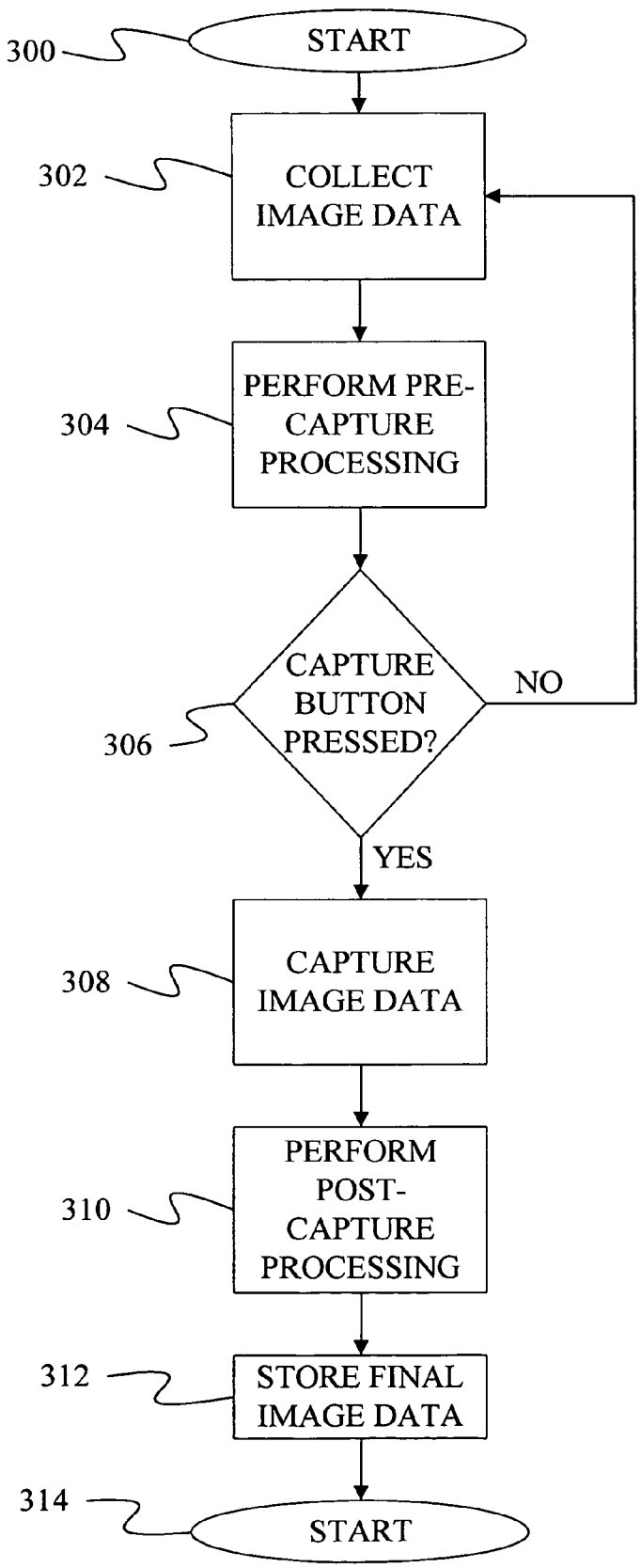
FIG. 2 is a flow diagram of a method under one embodiment of the present invention.
Figure 3:
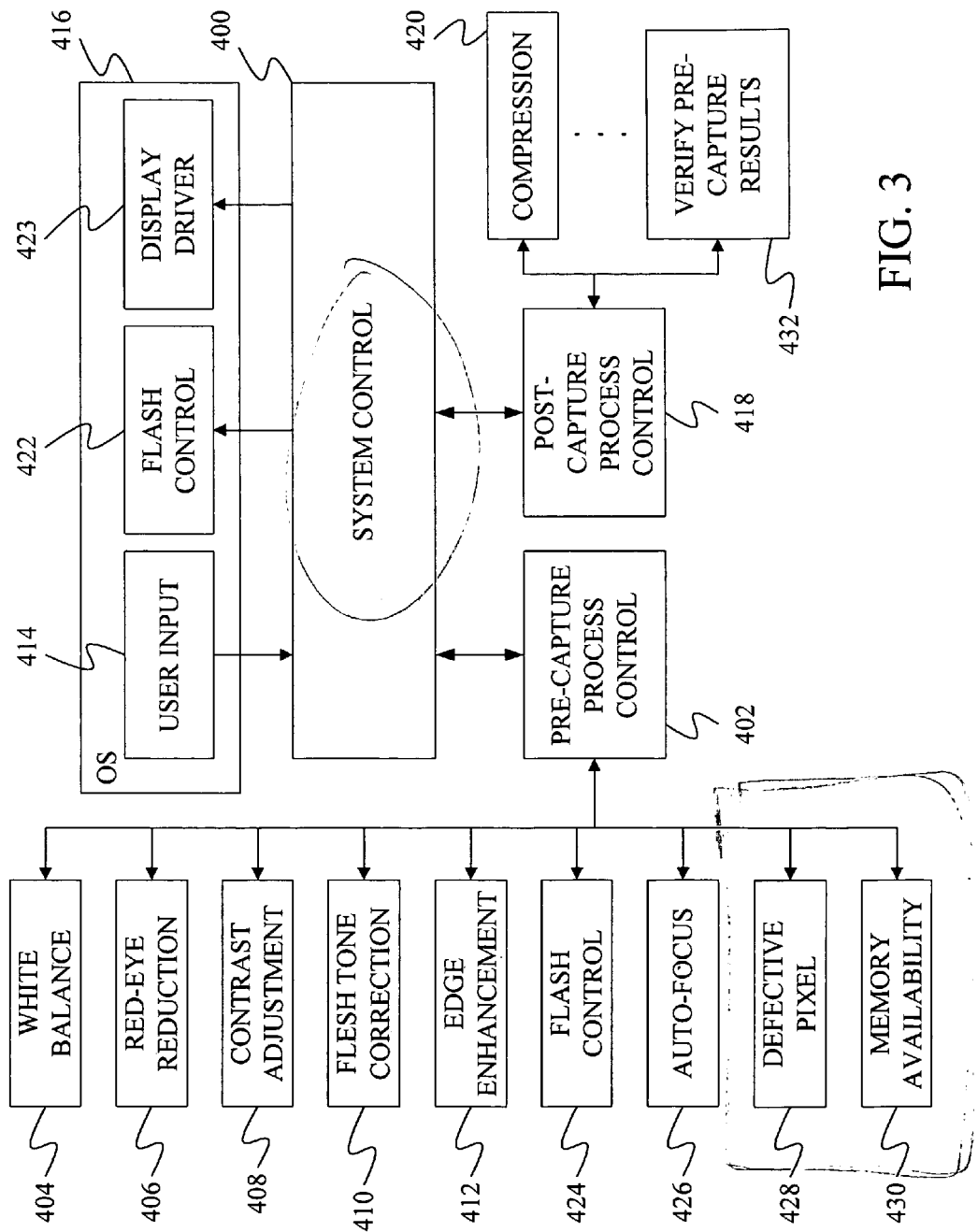
FIG. 3 is a block diagram of software components under one embodiment of the present invention.

FIG. 2 is a flow diagram of a method for capturing images under one embodiment of the present invention. Under one embodiment, the process of FIG. 2 is performed by image processor 214 by invoking a set of software components. FIG. 3 provides a block diagram of some of these components, which are described below in connection with the method of FIG. 2.

The method of FIG. 2 begins at step 300 and proceeds to step 302 where a system control component 400 invoked by image processor 214 causes image data for a frame of light to be written to register 212. System control 400 then retrieves the stored values from register 212 and at step 304 invokes a pre-capture process control 402 that controls one or more pre-capture processing functions.

Under one embodiment, pre-capture process control 402 invokes one or more separate image processing components such as white balance component 404, red-eye reduction component 406, contrast adjustment component 408, flesh tone correction component 410, and edge enhancement component 412 of FIG. 3. When invoked, each of these components is given access to the image data. When a component completes its operation, it typically returns one or more processing values to pre-capture process control 402. Under some embodiments, pre-capture process control 402 invokes two or more of the image processing components in parallel. In other embodiments, the image processing components are invoked serially.

In some embodiments, pre-capture process control 402 also invokes processing functions to test the performance of some hardware components of the camera. For example, under one embodiment, pre-capture process control 402 invokes a defective pixel detection component 428, which determines if one or more of the CCD transistors is malfunctioning. In other embodiments, pre-capture process control 402 invokes a memory availability component 430, which determines if long term image storage 220 of FIG. 1 has enough available memory to accommodate the next image. If there is insufficient available memory, system control 400 either sends a message to the user through a display driver 423 in operating system 416 or reallocates the memory resources by remapping virtual address space, terminating other components or minimizing other components. When system control 400 reallocates the memory resources, it acts as a memory management component. As shown in FIG. 1, this message is provided to the user through a display 230 that is controlled by a display interface 232. Display interface 232 receives its display data from display driver 423 in image processor 214.

Returning to the method of FIG. 2, after step 304, system control 400 checks to see if the user has pressed the image capture button at step 306. Under some embodiments, information as to whether the user has pressed the button is provided by a user input component 414 shown in operating system 416 in FIG. 3. If the capture button has not been pressed at step 306, the process of FIG. 2 returns to step 302, and steps 302 and 304 are repeated.

If the capture button has been pressed at step 306, system control component 400 captures image data for a second frame of light at step 308. System control component 400 then invokes a post-capture process control component 418 that invokes one or more image processing components at step 310. Some of the image processing components, such as compression component 420 of FIG. 3, change the image data as they process it. If another image processing component is invoked after a component that changes the image data, the subsequent image processing component receives the modified image data. Post-capture process control 418 also acts as an image production control that utilizes the results of the pre-capture processing components and the post-capture processing components to produce a final set of image data.

At step 312, the final set of image data is stored in long-term image storage 220 of FIG. 1. Under the embodiment of FIG. 3, the process of storing the final image data is controlled by operating system 416. After the final image data has been stored, the process of FIG. 2 ends at step 314.

Figure 4:
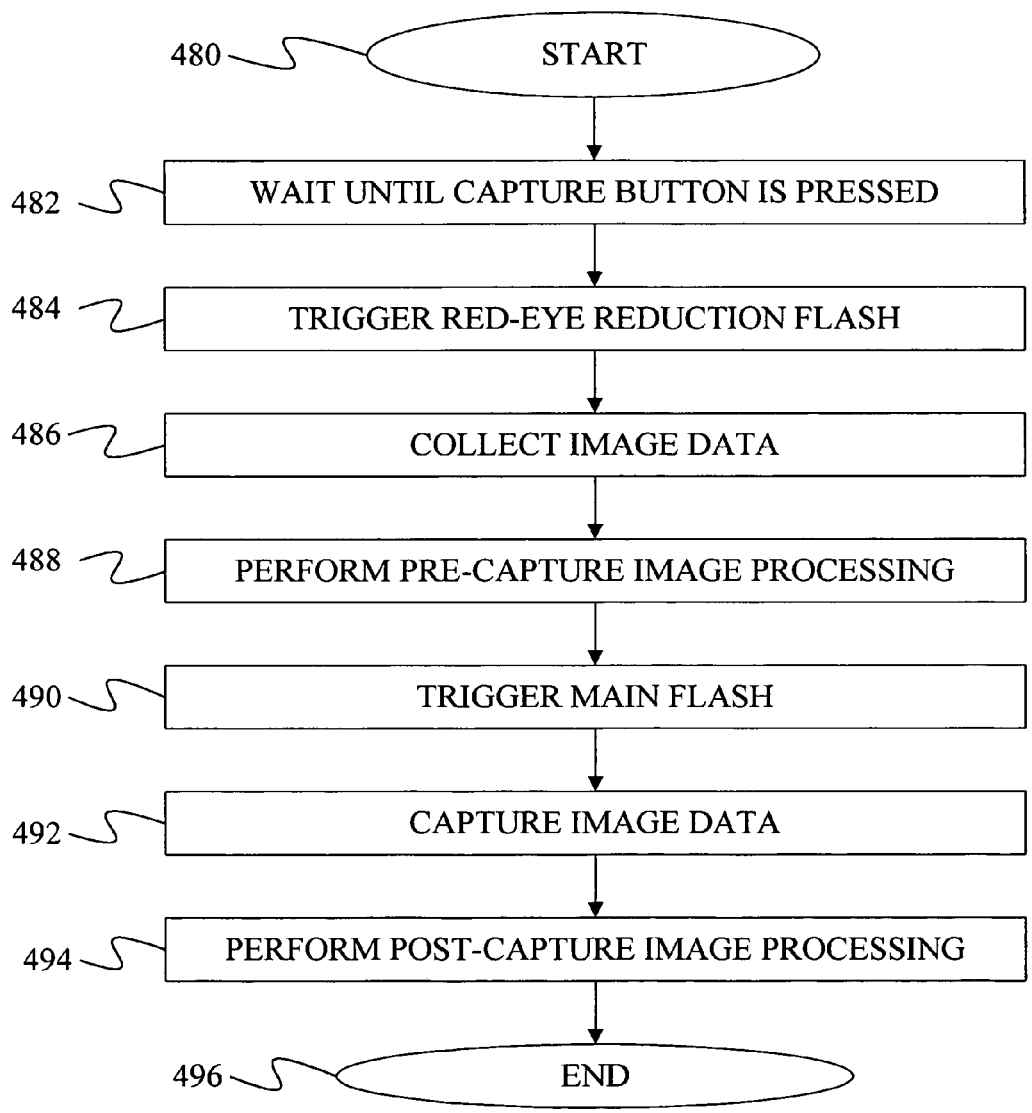
FIG. 4 is a flow diagram of an alternative method under one embodiment of the present invention.

FIG. 4 provides a flow diagram for an alternative method of capturing images under the present invention. The process of FIG. 4 starts at step 480 and continues at step 482 where system control 400 waits for the user to depress the capture button. When the user depresses the capture button, system control 400 uses a flash control component 422 in operating system 416 of FIG. 3 to trigger a red-eye reduction flash at step 484 of FIG. 4. At step 486, system control 400 captures image data generated from a frame of light that includes light from the red-eye reduction flash. The red-eye reduction flash illuminates the subject of the photograph so that the captured image has color, contrast, and brightness characteristics more similar to the image produced when the main flash is later triggered, as described below.

At step 488, system control 400 invokes pre-capture process control 402, which invokes one or more processing components as described above.

In addition to using some or all of the processing components described above, some embodiments that utilize the method of FIG. 4 perform an additional pre-capture processing function. This additional function is performed by flash control 424 in FIG. 3 and involves adjusting the parameters of the camera's flash system. For example, in some embodiments, flash control 424 changes the duration and/or brightness of the flash. The changes to the flash parameters are stored in register 228 of FIG. 1 through flash control 422 of operating system 416.

When the pre-capture processing is complete, the method of FIG. 4 continues at step 490 where system control 400 triggers the main flash. The image generated by the light of the main flash is then captured at step 492. At step 494, system control 400 invokes post-capture process control 418, which invokes one or more post-capture processing functions as described above. Post-capture process control 418 utilizes the results of the pre-capture processing and post-capture processing to form a final set of image data that is stored before the process of FIG. 4 ends at step 496.

Figure 5:
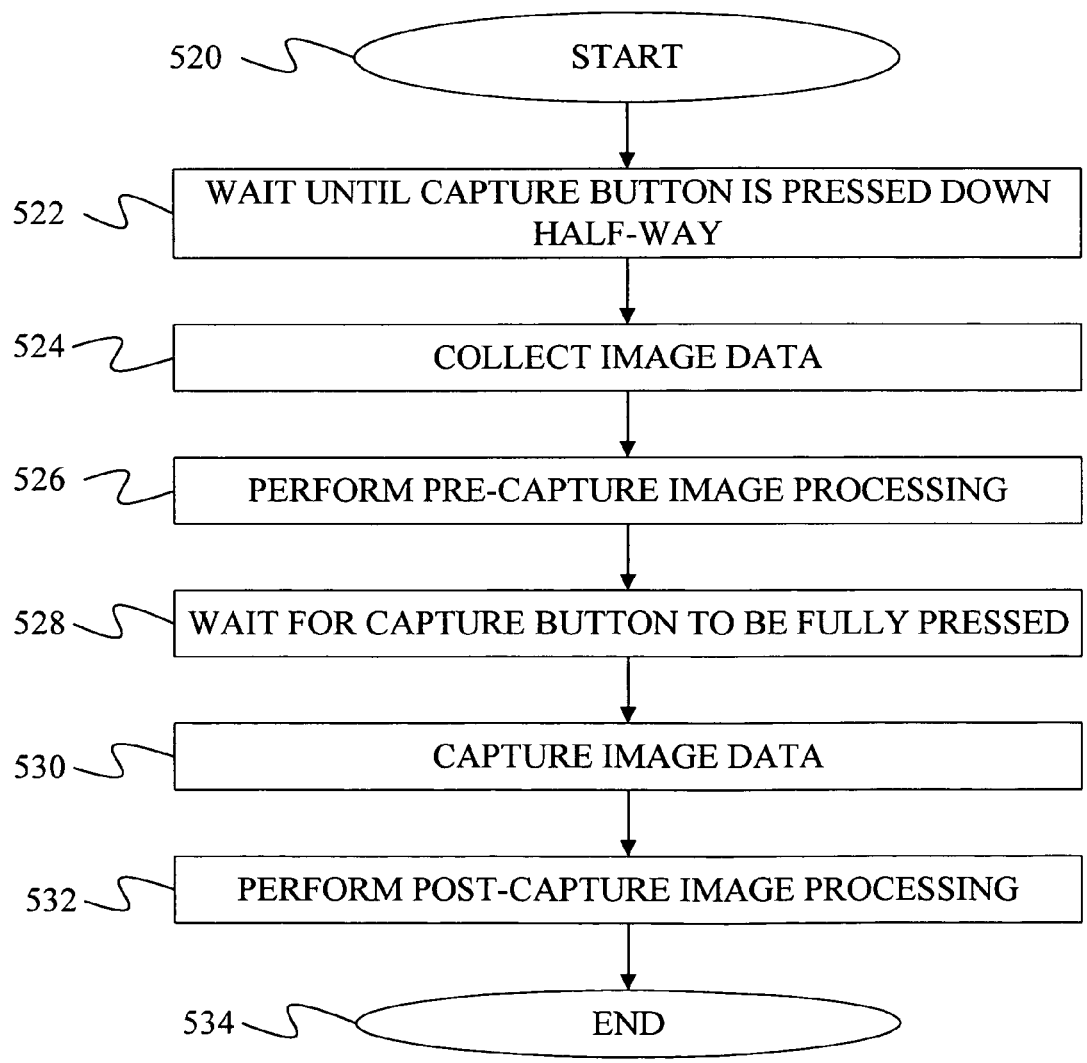
FIG. 5 is a flow diagram of an alternative method under one embodiment of the present invention.

FIG. 5 provides a flow diagram of an alternative method for capturing images under the present invention. The method of FIG. 5 begins at step 520 and proceeds to step 522 where system control 400 waits to receive a pre-capture event. The pre-capture event can be generated by a software routine based on a timer or some other triggering event or can be generated when the user presses the capture button half-way down. When the pre-capture event occurs, the method of FIG. 5 continues at step 524 where system control 400 captures image data for a first frame of light. At step 526, system control 400 invokes pre-capture process control 402, which invokes one or more pre-capture processing components as described above in connection with FIGS. 2 and 3. In the method of FIG. 5, the pre-capture processing components can include an auto-focus component such as auto-focus component 426 of FIG. 3.

After pre-capture process control 402 has finished executing, system control 400 waits for the user to fully depress the capture button at step 528. When the user fully depresses the capture button, system control 400 retrieves a new set of image data based on a second frame of light that entered the camera just after the capture button was depressed. This is shown in step 530 of FIG. 5. System control 400 then invokes post-capture process control 418 at step 532. Post-capture process control 418 invokes one or more post-capture processing components and utilizes the results from the pre-capture processing components and the post-capture processing components to form a set of final image data. System control 400 then stores the final image data before the method of FIG. 5 ends at step 534.

Figure 6:
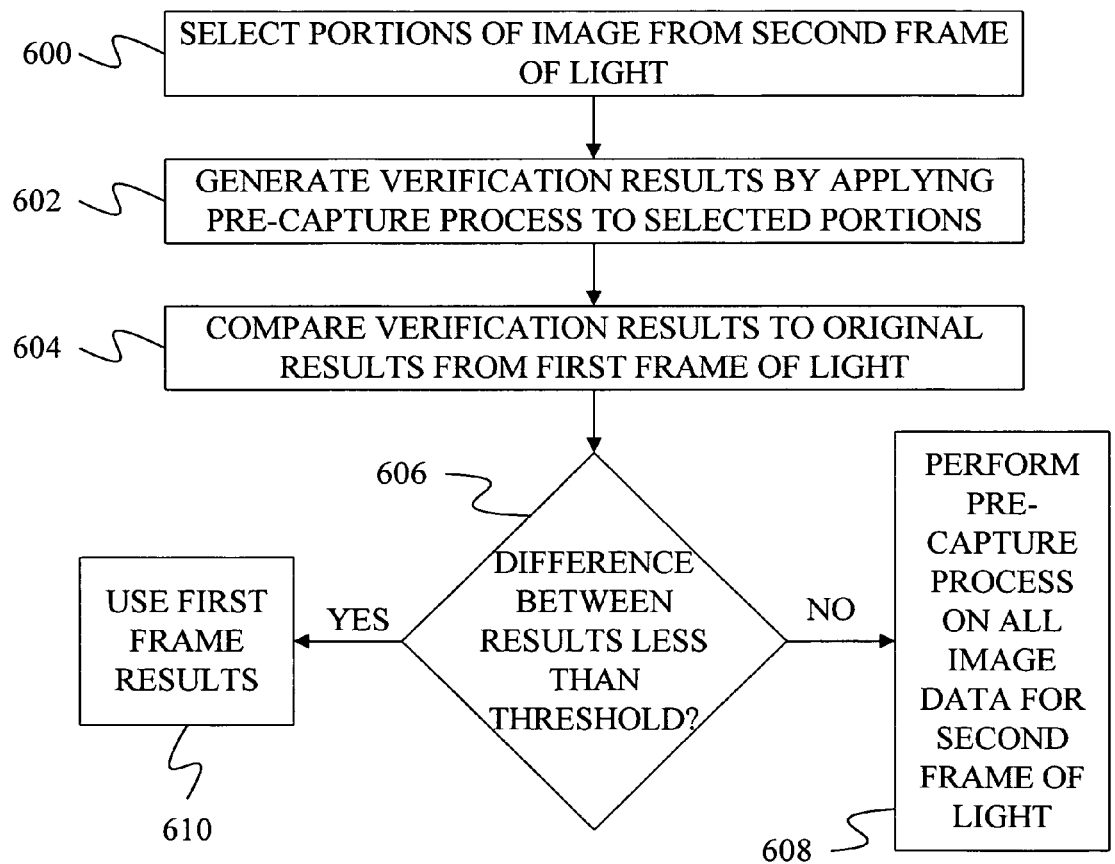
FIG. 6 is a flow diagram of a method of verifying pre-processing results under one embodiment of the present invention.

Under some embodiments of the invention, post-capture process control 418 invokes a verify pre-capture results component 432 to verify the results from one or more of the pre-capture components before utilizing those results. Such verification is helpful because the lighting conditions may have changed between the time when the image data for the first frame of light was collected and the time when the image data for the second frame of light was collected. FIG. 6 is a flow diagram of one method for verifying the pre-capture processing results.

The method of FIG. 6 begins at step 600 where a portion of the image data for the second frame of light is selected. At step 602, this sub-set of image data is provided to the pre-capture processing component that is having its results verified. This produces a verification result that is compared to the original result produced by the pre-capture processing component for the first frame of light. This comparison is performed in step 604. The difference between the two results is compared to a threshold at step 606. If the two results differ by more than the threshold, all of the image data for the second frame of light is passed to the pre-capture processing component to generate a new result at step 608. If the two results differ by less than the threshold, the original result formed from the first frame of light is used at step 610. Thus, if image conditions have changed substantially between the first and second frames of light, the pre-capture processing functions are repeated using the second frame of light instead of the first frame of light. However, if image conditions have not changed substantially between the frames of light, the results formed from the first frame of light are used to determine the final image data.

Although the present invention has been described with reference to particular embodiments, workers skilled in the art will recognize that changes may be made in form and detail without departing from the spirit and scope of the invention.

What is claimed is:

1. A method of capturing images in a camera, the method comprising:
   acquiring a first set of image data based on a first frame of light entering the camera;
   performing at least one pre-capture processing function on the first set of image data to produce a pre-capture result;
   acquiring a second set of image data based on a second frame of light entering the camera;
   performing at least one pre-capture processing function on a portion of the second set of image data to produce a test result and comparing the test result to the pre-capture result;
   generating final image data by modifying the second set of image data.

2. The method of claim 1 wherein performing at least one pre-capture processing function comprising performing a white balance processing function to produce a white balance value as the pre-capture result.

3. The method of claim 1 wherein performing at least one pre-capture processing function comprises performing a contrast adjustment function to produce a contrast value as the pre-capture result.

4. The method of claim 1 wherein performing at least one pre-capture processing function comprises performing a flesh tone correction function to produce a flesh tone correction value as the pre-capture result.

5. The method of claim 1 further comprising receiving an external indication that an image should be captured before acquiring the second set of image data.

6. The method of claim 1 further comprising receiving a pre-capture event before acquiring the first set of image data.

7. The method of claim 6 wherein the pre-capture event is an indication that a user has pressed a capture button half-way down.

8. The method of claim 6 wherein the pre-capture event is produced by a software routine.

9. The method of claim 1 further comprising performing the pre-capture processing function on the entire second set of image data if the test result and pre-capture result are not sufficiently similar.

10. A camera having processor-executable components for capturing images, the components comprising:
    an image acquisition component capable of acquiring image data representing a single frame of light;
    a pre-capture processing component capable of performing a pre-capture function based on image data acquired by the image acquisition component for a first frame of light and capable of performing the pre-capture function on a portion of image data acquired by the acquisition component for a second frame of light;
    a comparison component capable of comparing the results of performing the same pre-capture function on the image data for the first frame of light and on the portion of the image data for the second frame of light; and
    an image production component capable of producing final image data by modifying the image data acquired for the second frame of light.

11. The camera of claim 10 wherein the pre-capture processing component is capable of performing a white balance function based on the image data for the first frame of light.

12. The camera of claim 10 wherein the pre-capture processing component is capable of performing a contrast function based on the image data for the first frame of light.

13. The camera of claim 10 wherein the comparison component causes the pre-capture processing component to perform the pre-capture function on all of the image data for the second frame of light when the results of performing the pre-capture function on a portion of the image data for the second frame of light are substantially different than the results of performing the pre-capture function on the image data for the first frame of light.

\* \* \* \* \*